United States Patent [19]

Small et al.

[11] 4,280,923

[45] Jul. 28, 1981

[54] METHOD FOR FRACTIONATING SOLUBLE POLYMERS AND COLLOIDAL PARTICLES

[75] Inventors: Hamish Small; Jitka K. Solc, both of Midland, Mich.

[73] Assignee: The Dow Chemical Company, Midland, Mich.

[21] Appl. No.: 970,493

[22] Filed: Dec. 18, 1978

[51] Int. Cl.³ .......................................... B01D 17/00
[52] U.S. Cl. ..................... 252/323; 209/1; 209/155; 210/504; 210/656; 252/319; 252/325; 260/42.43; 260/96 R; 428/404; 428/407
[58] Field of Search ............... 252/303, 319, 323, 325; 210/31 C, 504; 260/42.43, 96 R; 428/404, 407; 55/67, 386; 209/1, 155

[56] References Cited

U.S. PATENT DOCUMENTS

| 3,295,296 | 1/1967 | Halasz et al. ........................ 55/386 X |
| 3,489,699 | 1/1970 | Battaerd et al. ........................ 521/28 |
| 3,492,155 | 1/1970 | Baitsholts et al. ............. 210/31 C X |
| 3,698,931 | 10/1972 | Horowitz ............................ 427/399 |
| 3,865,717 | 2/1975 | Small ........................................ 209/1 |
| 3,962,206 | 6/1976 | Butler ................................. 260/96 R |

FOREIGN PATENT DOCUMENTS 5145686  4/1976  Japan ......................................... 521/33

OTHER PUBLICATIONS

Horvath et al., "Fast Liquid Chromatography . . .", Anal. Chem., vol. 39, No. 12, Oct. 1967, pp. 1422-1428.

Primary Examiner—Richard D. Lovering

[57] ABSTRACT

Colloidal particles are fractionated by size and dissolved polymers are fractionated by molecular weight by passing a polar solvent dispersion containing one or both through a bed of surface-bonded particles wherein the particles consist of a nonswellable inert core with a polar solvent-swellable surface coating of bonded organic polymer. The core can be either an insoluble cross-linked organic polymer gel or an inorganic solid such as silica or alumina.

7 Claims, 16 Drawing Figures

METHOD FOR FRACTIONATING SOLUBLE POLYMERS AND COLLOIDAL PARTICLES

BACKGROUND OF THE INVENTION

The present invention relates to a gel chromatographic method whereby polar solvent-soluble polymers can be fractionated according to molecular weight and colloidal particles can be fractionated according to particle size. The two kinds of fractionation can be accomplished simultaneously. The invention also concerns particular surface-bonded particles and the process for making these coated particles which make the above fractionations possible.

The fractionation of colloidal particles, i.e., particles from about 100 Angstrom units diameter to as large as 5 to 10 microns in size, dispersed in a liquid medium according to particle size has been accomplished previously by passing the dispersion through a porous bed of finely divided solid such as very small beads of glass or insoluble resin, see Small, U.S. Pat. No. 3,865,717. However, there is often loss of some or even all of the colloidal particles to the column packing when the particle size of the packing is made smaller in an effort to increase the efficiency of the fractionation.

The application of gel permeation chromatography to the fractionation of water-soluble polymers by molecular weight requires mechanically stable column packing compatible with aqueous eluants and this application so far has been difficult and limited. Butler, U.S. Pat. No. 3,962,206 describes such an approach. Aqueous exclusion chromatography using glass beads of controlled porosity as a column packing has been used with some success in this area. However, many problems such as molecular weight range limitations and the adsorption of polycations, many polyampholytes and nonionic polymers to the column's substrate remain to be solved.

SUMMARY OF THE INVENTION

A chromatographic method has now been found whereby fractions of different particle size from a suspended colloidal particle system and fractions of different molecular weight from a dissolved polymer system can both be separated by passing a polar solvent dispersion containing at least one of those systems through a bed of essentially nonswellable inert granules having a bonded surface coating of about 0.01-10 percent by weight of a bonded hydrophilic polymer, that surface coating being highly swellable by the plar solvent.

The core granules can be either a nonporous crosslinked polymer gel or an insoluble inorganic solid having reactive sites on its surface such as silica, alumina, aluminum silicate, barium sulfate, or an insoluble metal oxide.

DETAILED DESCRIPTION OF THE INVENTION

Figure 1:
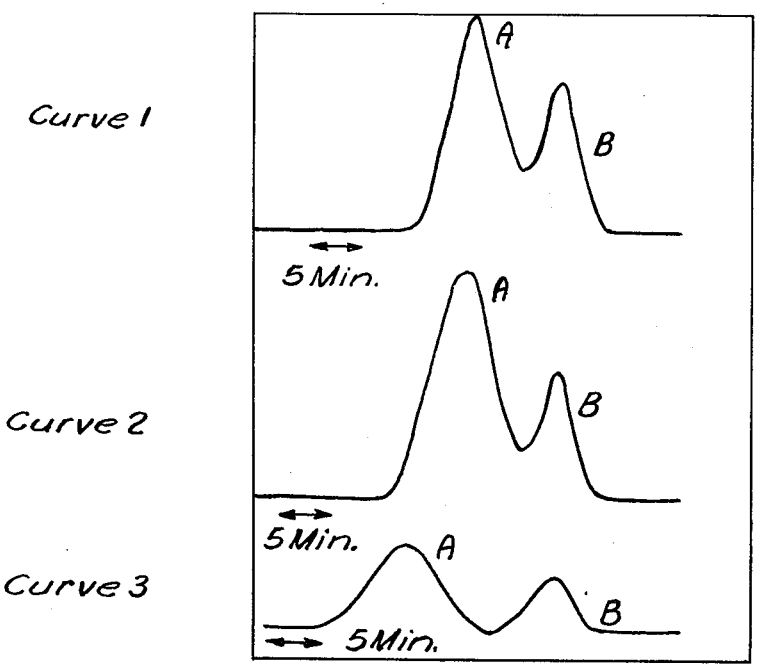
FIGS. 1-16 are chromatographic elution curves showing experimental results from Examples 1-17 wherein refractive index or ultraviolet light absorption as indicated in the examples showing relative molecular or particle size respectively in the eluted fraction is plotted against elution time.

The coated resin particles of the present invention are closely similar to some of those disclosed by Battaerd et al., U.S. Pat. No. 3,489,699 although there are differences in the amount of coating polymer and in the process by which the coating is prepared. A resin forming the nucleus or core of the coated resin granules can be any rigid solid organic resin which is insoluble in and not swollen by polar solvents, particularly water, or the monomer or polymer used to form the outer coating, which is inert in that it does not interact with the colloidal dispersion or water-soluble polymer solution to affect the fractionation, and which can be chemically bonded to the outer coating of hydrophilic polymer molecules. Examples of suitable core resins include cross-linked polystyrene resins such as styrene-divinylbenzene copolymers, polyethylene, polypropylene, polychlorotrifluoroethylene, polytetrafluoroethylene, and polyesters. Other such resins include polyamides, polycarbonates, polyacrylates, and numerous other such resins within the above limitations that are insoluble in and not swollen by polar solvents. These resins may also contain ionic substituents such as sulfonate, hydroxyl, and carboxyl to the extent that the presence of these substituents does not significantly affect the essential properties of the core resin as previously described.

The core of the coated particles of this invention can also be a water-insoluble inorganic solid having reactive sites on its surface to which a polymer molecule can be bonded by known techniques. Examples of such solids include silica, alumina, aluminum silicate, barium sulfate, calcium carbonate, and insoluble metal oxides such as titanium oxide, magnesium oxide, and ferric oxide. Such solids are known to have reactive surface sites such as hydroxyl groups which can serve as anchoring points for a polymeric chain when the solid and a polymerizable monomer are contacted under polymer-forming conditions.

The size of the core granules has approximate upper and lower limits for practical reasons of convenience and efficiency of operation. Generally, a bed composed largely of particles below 5 microns in diameter offers too much resistance to flow for operation at a reasonable pressure. A bed where the particles are largely above 100 microns in diameter is usually inefficient in operation because of the relatively large void spaces formed in the column. Particles up to 150-200 microns in size can be tolerated when a significant proportion of smaller particles are present to fill such voids, however. Usually, beds of particles of about 10-75 microns diameter are preferred and particles of about 10-50 microns diameter are most preferred.

The outer coating of swellable polymer on the granules can be formed by any known surface-bonding technique such as generally described by Battaerd et al. referred to above, by Horowitz, U.S. Pat. No. 3,698,931, or by Horvath et al., Anal. Chem. 39, 1422 (1967). Inorganic granules, in particular, can also be coated with polymer molecules by a mechanical abrasion initiation of polymerization in a ball or vibrator mill as described by Tamura, Japanese Pat. No. 76/45686. Preferably, the coating is formed by irradiating a mixture of core particles and about 0.05-0.5 parts based on the weight of core particles of liquid hydrophilic monomer or polymer with a source of high intensity ionizing radiation such as gamma rays. Gamma ray irradiation is preferably carried out at about room temperature using a radiation rate of approximately 0.1-1.0 megarad per hour and a maximum dose of about 3 megarads. Optimum results have been obtained by irradiation at about 0.1–0.4 megarad per hour with a total dose of about 0.1–3 megarads. Generally, cationic coatings are best prepared using radiation rates in the higher range and nonionic coatings require relatively high total doses of radiation, the optimum amount of radiation in each case varying inversely with the reactivity of the monomer or polymer used to form the coating.

The use of nonpenetrating radiation such as an accelerated electron beam to initiate polymerization requires a modified technique, for example, polymerization in shallow trays with a lower dose rate of about 0.005–0.02 megarads per pass with total dosage and other conditions generally as described above.

The surface-bonding process can be carried out successfully using either the hydrophilic monomer or a polymer thereof. A solvent for the hydrophilic monomer or polymer is preferably employed and polar solvents such as water, aqueous NaOH, methanol, ethanol, or aqueous alcohol are preferred. The proportion of coating reactant to core particles as defined above is calculated to produce a coated product where the swellable polymer coating amounts to about 0.01–10 percent by weight of the whole depending on the core particle size used.

The polymer coating can be one of two structurally different classes, both of these having the common property of being swollen by a polar solvent and consequently the common utility for the chromatographic separation by particle size or by molecular size of colloidally dispersed particles and water-soluble polymers respectively as described above. The first of these classes comprises polymers of polymerizable alpha-olefins having a functional group substituent which is either ionic in nature or capable of forming a metal chelate or complex. Examples of such groups include carboxyl, amino, quaternary ammonium, amido, carboxy ester groups, and sulfonate. Thus, alpha-olefins under this definition include acrylic acid, methacrylic acid, acrylamide, aminoethyl, methacrylate, hydroxyethyl, acrylate, vinylbenzyltrimethylammonium chloride, vinyl acetate, and other such monomers. Polar solvent-soluble polymers of such monomers can also be bonded to the core particles as previously described.

The second class of polymer coatings of this invention are the water-soluble or methanol-soluble polyethylene glycols, polypropylene glycols, and mixed ethylene-propylene polyglycols. These are most effectively bonded to the core particles by irradiating a mixture of the core particles and a solution of the polyglycol.

It has been found that when a monomer as defined above is graft polymerized to form a bonded coating on a core particle, it is essential for optimum chromatographic separation properties in the coated product that the polymerization process be carried out under conditions which favor homopolymerization. Coated particles prepared in the presence of a homopolymerization inhibitor such as traces of certain metals have been found to have very poor separation properties even though the graft polymerization was otherwise carried out under optimum conditions. The best coated products of this invention are obtained when either no homopolymerization inhibitors are present or when the effect of such inhibitors is neutralized, for example, when a metal chelant such as ethylenediaminetetraacetic acid is present in the polymerization mixture to complex and so inactivate traces of copper or other such inhibiting metal which may be present.

The mixture of bonded core particles, homopolymer, and solvent which is obtained from the polymerization process is preferably washed with water, aqueous sodium hydroxide, methanol, or other such polar solvent which may be appropriate in order to remove most but not all of the homopolymer. For some reason not fully understood, exhaustive washing or extraction to remove all traces of homopolymer also destroys some of the desirable properties of the coated product.

A particularly useful and preferred coated product of the present invention comprises a core material as defined having a bonded coating of polymeric alpha-olefinic carboxylic acid, for example, polyacrylic acid or polymethacrylic acid. As explained above, such surface-bonded coatings can be formed by irradiating a mixture of the particulate core material with either the polymeric acid or the monomeric acid under conditions favoring homopolymerization. It has been found that optimum chromatographic separation properties in the present process are obtained when these preferred coated products have a coating providing about 0.01–1 milliequivalents per gram of carboxylic acid groups.

Another coated product of the invention which has particularly valuable properties is that where the coating is a polymerized cationic compound such as vinylbenzyltrimethylammonium chloride, aminoethyl methacrylate hydrochloride, or other monomer of that type. Such coated products are useful for the fractionation of water-soluble cationic polymers, cationic polyelectrolytes, polyoxazolines, and other such polymers.

The present process for chromatograhic separation by particle or molecular size can be carried out in conventional chromatographic columns which may range from one to ten millimeters inside diameter and from about ten centimeters to several meters in length. Normally, these separation processes are carried out under superatmospheric pressure although such pressure may not be required in some cases. A particular advantage of the present process is that a separation can be carried out in the space of relatively few minutes. Thus, in a comparatively short time, the different particulate and/or molecular size components of a dispersion or solution can be determined. With appropriate calibration, the actual sizes of these components as well as their relative properties can be measured.

EXAMPLES 1–5

Spherical sytrene-divinylbenzene (S-DVB) copolymer particles (16 weight percent divinylbenzene) were washed with 3 N NaOH for 6 hours at 90° C., then with 6 N HCl for 7 hours at 90° C. The S-DVB copolymer particles were then thoroughly washed with water, air dried, and extracted for 48 hours in a Soxhlet apparatus with methylene chloride. The washed particles were dried under vacuum for 16 hours and sieved. That passing through a 270 mesh screen was used as the base for coating with polymer.

The sized copolymer particles were combined with acrylic acid (AA) and methanol in a glass flask in the proportions indicated and the flask was degassed and flushed four times with nitrogen in a solid $CO_2$-methylene chloride cooling bath. The flask and its contents were then irradiated as shown with a 100,000 curie $Cs^{137}$ source at about 25° C. The irradiated polymer particles were separated, washed with aqueous sodium hydroxide, water and methanol at room temperature, and dispersed in water.

TABLE I

| Resin No. | S-DVB grams | AA ml | CH₃OH ml | Radiation MR[1]/hr | Radiation total MR[1] | Product meq/g[2] |
|---|---|---|---|---|---|---|
| 1 | 30 | 6 | 40 | 0.18 | 0.57 | 0.022 |
| 2 | 30 | 6 | 50 | 0.35 | 0.7 | — |
| 3 | 60 | 12 | 60 | 0.35 | 0.7 | — |
| 4 | 100 | 20 | 100 | 0.175 | 0.7 | 0.135 |

[1] MR = megarads
[2] meq/g = milligram equivalents of —COOH per gram of coated resin determined by titration Resin No. 1 was packed in a 0.125 inch O.D. by 10 feet stainless steel coil column using an aqueous slurry of the coated resin under pressure. The eluant was 0.01 molar sodium borate, pH 10, pumped through the packed column at a constant rate of 0.04–0.06 ml/min. Samples prepared in the eluant were injected in about 0.1 percent concentration and the effluent was monitored by a differential refractometer. Pressure drop at the column inlet varied between 1000 and 2000 psi. Elution time of small molecular species was marked with a simple molecule such as ethylene glycol or a salt such as NH₄Cl. FIG. 1 shows elution curves for three samples of polyacrylic acid having average molecular weights of 2000 (Curve 1), 5000 (Curve 2), and 90,000 (Curve 3). In each case, peak B represents the elution time of the small molecular species present and peak A represents the elution time of the polyacrylic acid.

Figure 2:
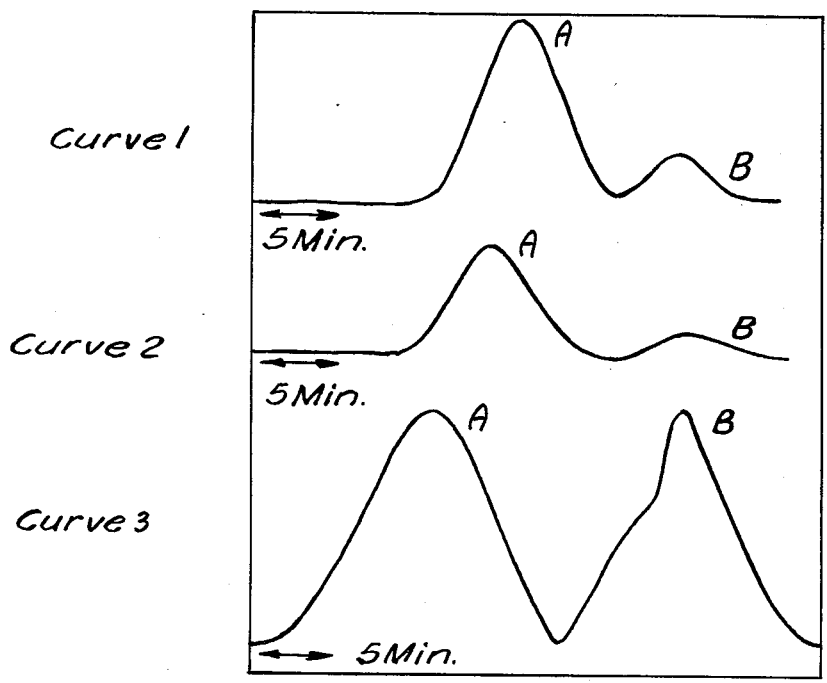

Similarly, FIG. 2 shows the elution curves obtained from the same column for samples of styrene-maleic acid copolymer 20 percent esterified with $CH_3O(C_2H_4O)_{10}H$ (Curve 1), styrene-maleic acid copolymer fully esterified with $C_{16}H_{33}O(C_2H_4O)_{40}H$ (Curve 2), and styrene-maleic acid copolymer prepared by precipitation polymerization at 50° C. (Curve 3).

Figure 3:
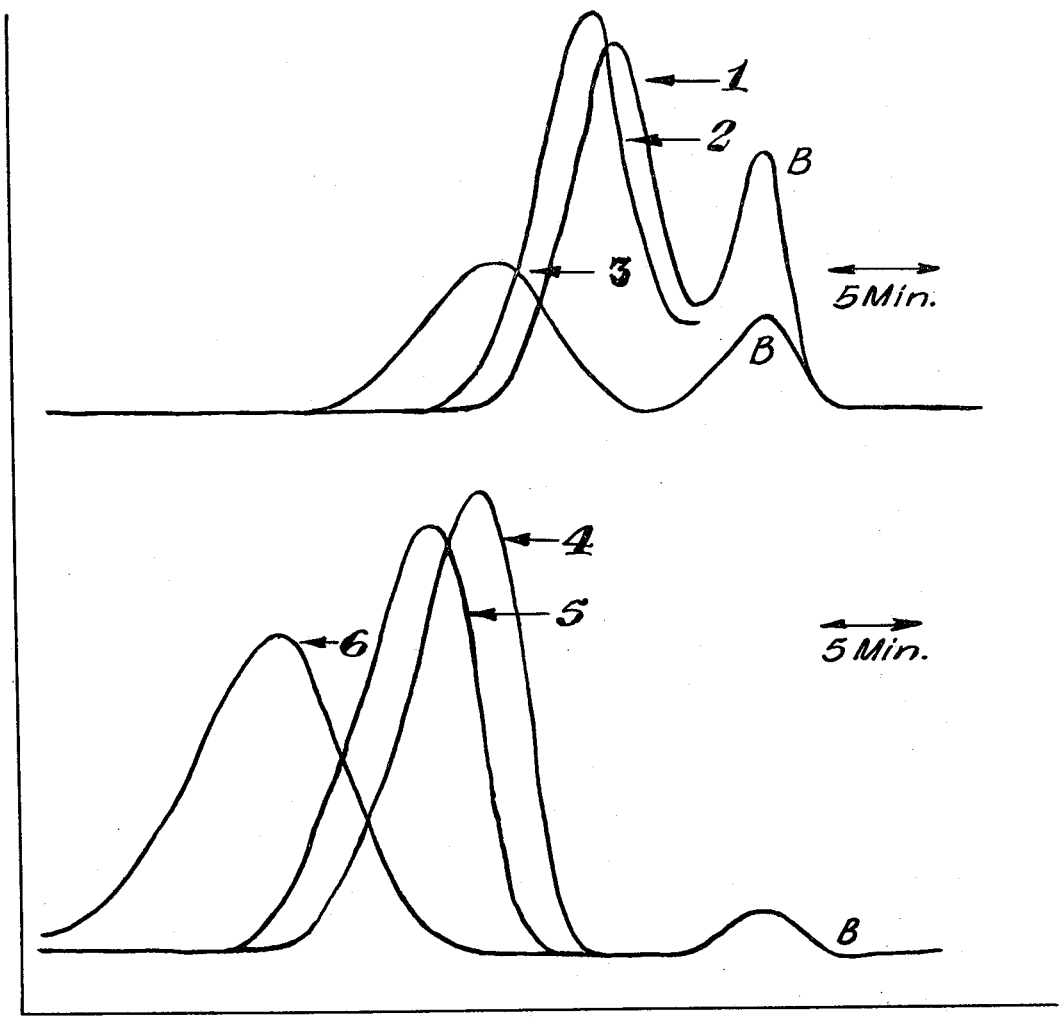

In FIG. 3, the effects of using a higher capacity resin under the above conditions are illustrated. Curves 1, 2, and 3 are those from FIG. 1 for the elution times of three samples of polyacrylic acid of progressively higher average molecular weights using the relatively low capacity Resin 1 while Curves 4, 5, and 6 are the corresponding curves obtained with the same samples of polyacrylic acid when the column was packed with the higher capacity Resin 2. In each case, peak B represents the elution time of the small molecular species present and the other peak shows the polymer elution time.

EXAMPLE 4

A 0.9 cm I.D. glass column was filled to a depth of 104 cm with unmodified S-DVB resin beads about 20 microns in diameter. An aqueous solution containing 0.5 g/liter sodium lauryl sulfate, 0.005 M sodium phosphate, and 0.001 M ethylenediaminetetraacetic acid was pumped through the column at 1.06 ml/min. About 0.1 ml of a dilute suspension (0.001–0.002 percent) of polystyrene latexes of various particle sizes (diameters of 5000, 2340, and 1090 Angstrom units) was injected into the head of the column and the elution times (and volumes) were measured. A similar measurement was made for a small ionic species, the dichromate ion, by injecting dilute sodium dichromate. The emergence of either the latex or dichromate was determined with a flowthrough spectrophotometer connected to the outlet of the column.

Figure 4:
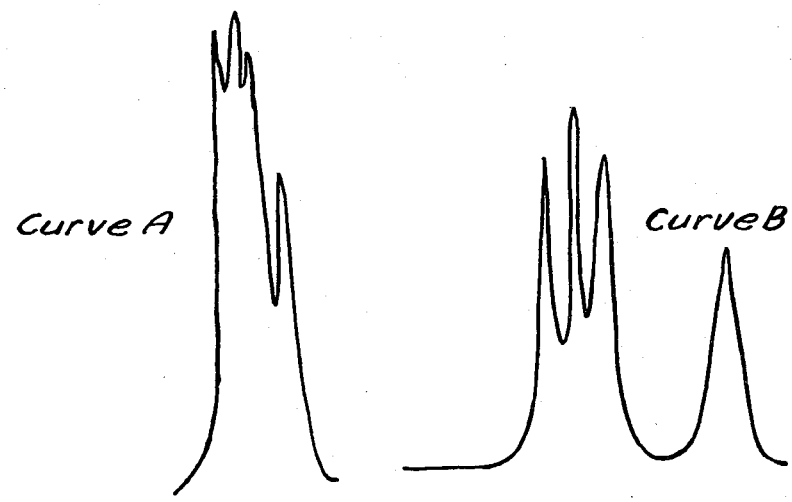

A corresponding column was filled to a depth of 88 cm with Resin 3 and the above procedure was repeated with that column. FIG. 4 shows the elution curves obtained, Curve A for the unmodified S-DVB resin bead packing and Curve B for Resin 3. The superior separation obtained with the bonded Resin 3 is clearly evident.

EXAMPLE 5

Figure 5:
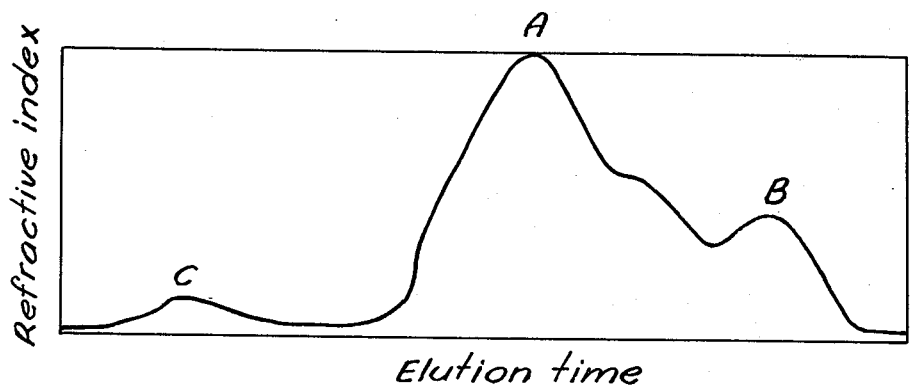

A stainless steel coil column 0.125 inch by 15 feet was packed with an aqueous slurry of Resin 4. The eluant was 0.01 N NH₄Cl at pH 8.7 pumped through at 0.04–0.06 ml/min. A sample of serum of a latex of polystyrene-butadiene copolymer modified with itaconic acid was injected at a concentration of 0.1 percent in the eluant and the effluent was monitored by a differential refractometer. The serum also contained a small amount of latex particles. These are seen as peak C in FIG. 5 where peaks A and B represent the water-soluble polymer formed in the aqueous phase and the small molecular species, respectively.

EXAMPLE 6

Polychlorotrifluoroethylene beads sized to about 10–15 microns diameter and treated as in the foregoing examples were combined with acrylic acid and methanol (30 g of polymer beads, 7 g of acrylic acid, and 30 ml of methanol) and the mixture was irradiated as above for 2 hours at 0.35 megarads per hour. The surface-bonded polymer particles were then washed as in Examples 1–5, dispersed in water, and packed in a 6.3 mm O.D. by 27 cm column of stainless steel tubing.

Figure 6:
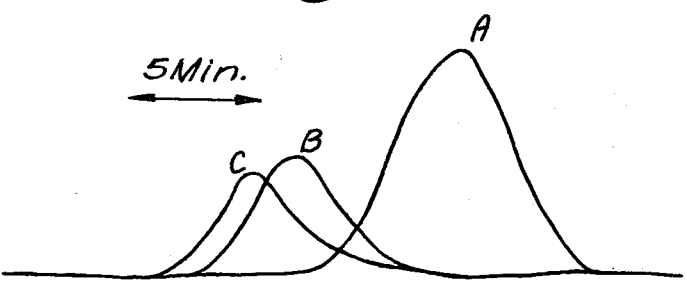

The eluant was 0.005 M sodium phosphate at pH 7 containing 0.5 g/liter sodium lauryl sulfate. This was pumped through the column at 0.4 ml/min. Samples of water solutions of sodium polystyrenesulfonate containing fractions of 1,800 and 100,000 mole weight and ethylene glycol as a small molecular species marker respectively were injected at a concentration of 0.1 percent in the eluant and the effluent from the column was monitored by a differential refractometer. FIG. 6 shows the differences in elution time by composite curves where peaks A, B, and C mark the ethylene glycol, low molecular weight polymer fraction, and the high molecular weight polymer fraction, respectively.

EXAMPLE 7

A sample of S-DVB resin beads with a bonded coating of acrylic acid was prepared essentially as described for Resins 2 and 3 above except that 1.5 weight percent ethylenediaminetetraacetic acid was added to the polymerization mixture to prevent inhibition of homopolymerization by possible metal contaminants. The resulting surface-bonded resin had a —COOH capacity of 0.05 meq/g.

Figure 7:
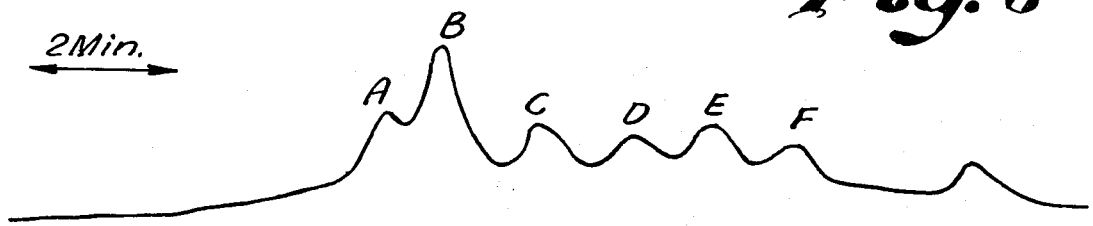

The coated resin was packed in a 12.7 mm O.D. by 50 cm column of stainless steel tubing. The eluant used was that of Example 6. The sample injected at 0.1 percent concentration was a mixed suspension and solution containing suspended particles of polystyrene latex of 3750 and 1760 Angstrom unit diameter (peaks A and B in FIG. 7) and dissolved sodium polystyrenesulfonate fractions of 400,000, 100,000, 35,000, and 8,000 molecular weight (peaks C, D, E, and F respectively in FIG. 7). The column effluent was monitored by measuring its absorption of ultraviolet light, which method showed the separation of latex particles by particle size as well as the separation of the various fractions of dissolved polystyrenesulfonate by molecular weight as illustrated by FIG. 7.

EXAMPLE 8

A 30 g sample of 200 mesh (about 75 microns) styrene-divinylbenzene copolymer beads treated as described in the above examples was mixed with 6 g of polyacrylic acid, average molecular weight 100,000, in 18 ml of methanol and irradiated as above for 4 hours at 0.175 megarads per hour. The resulting polymer beads with a bonded polyacrylic acid coating were washed as before and loaded into a 6.3 mm O.D. by 61 cm column for testing.

Figure 8:
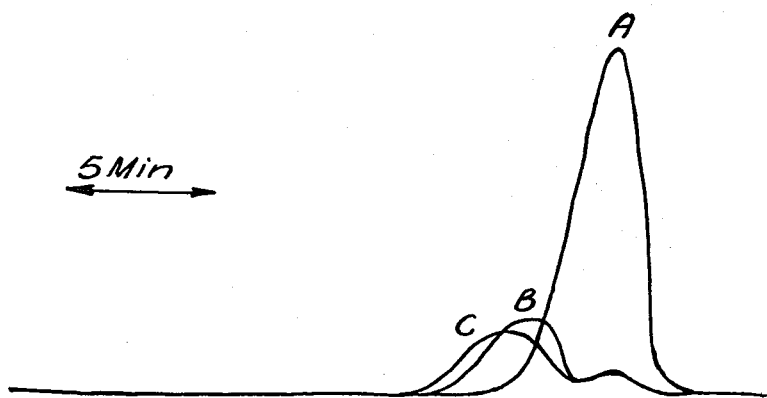

Samples of aqueous sodium polystyrenesulfonate containing respectively, fractions of 35,000 and 100,000 molecular weight and ethylene glycol as a small molecular species were separately injected at a concentration of 0.1 percent in an eluant of 0.005 molar sodium phosphate (pH=7) containing 0.5 g/l sodium lauryl sulfate. The column effluents were monitored by a differential refractometer. FIG. 8 shows the difference in elution times where peaks A, B, and C mark the ethylene glycol, lower molecular weight polymer fraction, and the higher molecular weight polymer fraction, respectively.

EXAMPLE 9

Polyethylene beads of 400 mesh (about 37 microns) were mixed with acrylic acid and irradiated as described in Example 6. After washing, the resulting resin beads coated with polyacrylic acid to a —COOH capacity of 0.08 meq/g were packed into a 6.3 mm O.D. by 50 cm column for chromatographic testing.

Figure 9:
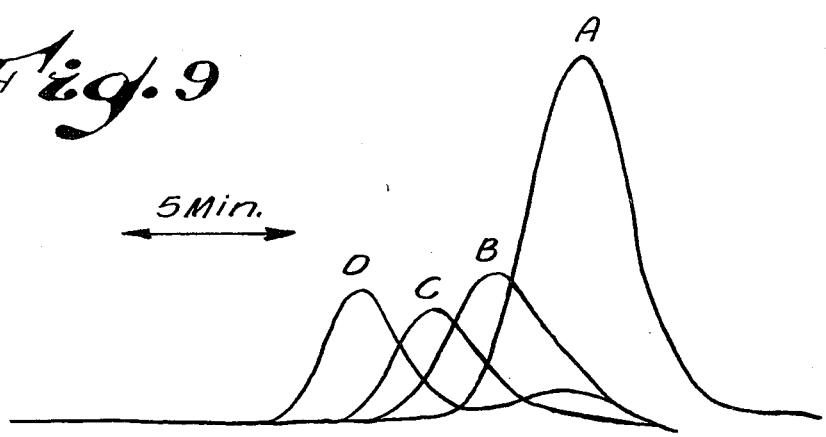

Samples of aqueous sodium polystyrenesulfonate containing fractions of 1,800, 35,000, and 400,000 molecular weight and ethylene glycol as the small molecular species were injected and the effluent monitored as in Example 8. FIG. 9 shows the differences in elution times where peak A marks the ethylene glycol and peaks B, C, and D mark the polymer fractions in the order of increasing molecular weight.

EXAMPLE 10

Dowex 50WX8 ion exchange resin (30-40 microns), a sulfonated S-DVB resin used in the form of the sodium salt, was coated with polyacrylic acid by irradiating a mixture of 70 g of resin and 11 g of acrylic acid in 70 ml of 50 percent aqueous methanol at 0.175 megarads per hour for one hour as previously described. The washed coated resin had a —COOH capacity of 0.32 meq/g. A column of 12.7 mm O.D. by 24 cm was packed with the coated resin.

Figure 10:
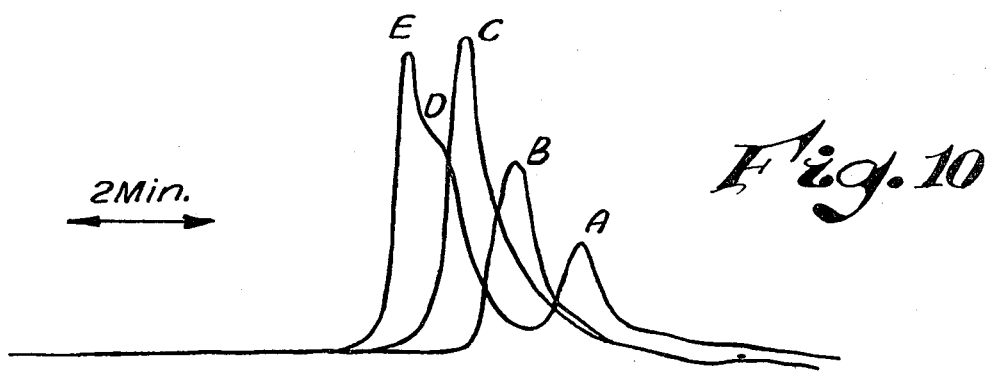

An aqueous dispersion containing dissolved sodium dichromate as a low molecular weight marker, sodium polystyrenesulfonate fractions of 35,000 and 400,000 molecular weight, and suspended particles of polystyrene latex of 880 and 2340 Angstrom units diameter was injected into the aqueous sodium phosphate eluant used in Examples 6-9. The column effluent was monitored by U.V. absorption as in Example 7. FIG. 10 contains superimposed elution curves for the latex particles and dissolved substances showing differences in elution times, peak A indicating the dichromate marker, peaks B and C indicating the sodium polystyrenesulfonate fractions of 35,000 and 400,000 molecular weight, respectively, and peaks D and E indicating the smaller and larger latex particles.

EXAMPLE 11

The procedure of Example 8 was repeated using methacrylic acid and styrene-divinylbenzene beads to produce resin beads coated with polymethacrylic acid to a carboxyl capacity of 0.2 meq/g. This resin was washed with methanol and water and packed in a 12.7 mm O.D. by 44 cm column and used for the chromatographic separation of sodium polystyrenesulfonate fractions of 35,000 and 100,000 molecular weight as described in Examples 6-9. The two polymer fractions and the ethylene glycol used as the low molecular weight marker were separated successfully as in the foregoing examples.

EXAMPLES 12-13

A mixture of 30 g of the S-DVB beads used in Examples 4 and 5 and 50 g vinylbenzyl trimethylammonium chloride (as a 20 percent solution in water) in 15 ml of methanol was irradiatd at 0.35 megarads/hr to a total dose of 2.2 megarads and washed with water to produce resin beads with the polymerized monomer. This type of resin product with the cationic polymer coating was particularly useful for the chromatographic separation of cationic water-soluble polymer fractions such as aminoethyl methacrylate polymers, cationic polyelectrolytes, polyoxazolines, and the like.

Figure 11:
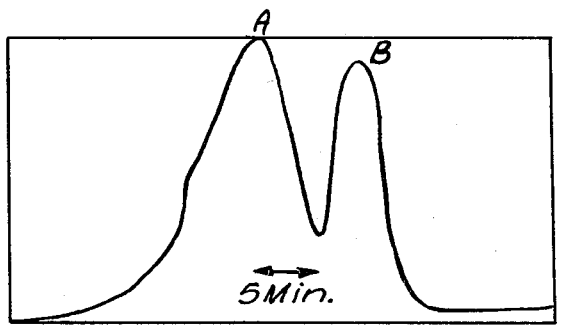
Figure 12:
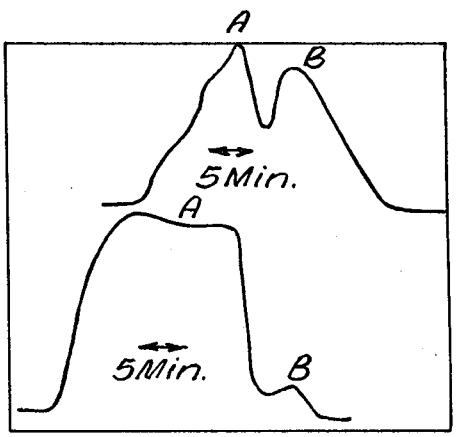

Using a 0.125 inch O.D. by 18 feet stainless steel coil column packed with the above-described resin and deionized water as the eluant, a low molecular weight polymer of 2-aminoethyl methacrylate hydrochloride was separated as shown in FIG. 11, peak A representing the polymer and peak B the elution of the small molecular species, ethylene glycol as monitored by refractive index. Similar separations by the same column of two different polyoxazolines are shown in FIG. 12, Curve 1 (average molecular weight=8,000) and Curve 2 (average molecular weight=680,000). In each case, peak A represents the polymer and peak B ethylene glycol.

EXAMPLE 14

A 30 g portion of 100 mesh (150 microns and smaller) styrene-divinylbenzene copolymer beads after treatment as described in the above examples was mixed with 10 g of polyethylene glycol, 100,000 average molecular weight, as a 10 percent aqueous solution and 20 ml of methanol. The mixture was irradiated as previously described for two hours at 0.35 megarads per hour. The resulting polymer beads after water washing had a bonded coating of polyethylene glycol molecules amounting to about 0.4 percent by weight.

Figure 13:
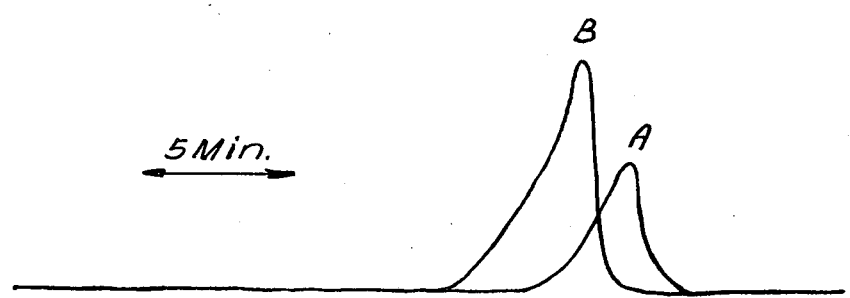

The coated beads after washing as before were loaded into a 6.3 mm O.D. by 61 cm column for testing. This column was used to demonstrate the difference in elution times for ethylene glycol and polyethylene glycol of about 20,000 average molecular weight using the procedure of Examples 6-9. The results are shown in FIG. 13 in superimposed elution time curves where peak A represents the ethylene glycol and peak B represents the polyglycol as indicated by refractive index measurements of the eluted liquid.

EXAMPLE 15

Figure 14:
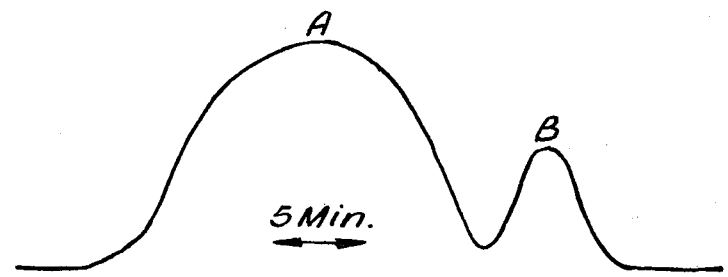

Resin No. 2 of Table I above was packed in a 0.125 inch O.D. by 15 feet stainless steel coil column. The eluant was 0.01 N NH$_4$Cl at pH 8.7 pumped through the column at 0.04–0.06 ml/min. A sample of Dextran T-70 (Pharmacia Fine Chemicals), average molecular weight=70,000, was injected at a concentration of 0.1 percent in the eluant and the effluent was monitored by a differential refractometer. The results are graphically shown in FIG. 14 where peak A represents the small molecular weight species present (ethylene glycol) and peak B represents the dextran.

EXAMPLE 16

A 90 g portion of 11 micron styrene-divinylbenzene copolymer spherical beads (6 percent divinylbenzene) after cleaning as described in Examples 1–5 was combined with 180 ml of methanol, 35 ml of acrylic acid and 2.5 g of ethylenediaminetetraacetic acid, and sodium salt in a shallow glass tray. The mixture was then irradiated at 25° C. under nitrogen with a 2 MeV electron beam from a Van de Graaff accelerator at a dose rate of 0.01 megarads per pass. After a total dose of 1.6 megarads, the irradiated polymer beads were separated, washed at room temperature as in Examples 1–5 and dispersed in water. The surface-bonded resin product had a —COOH capacity of 0.12 milliequivalent per gram.

The bonded resin beads were packed in a 1.25×50 cm column and the packed column was used for the successful chromatographic separation of both dissolved sodium dichromate and sodium polystyrenesulfonate fractions of 400,000 and 8,000 molecular weight and suspended polystyrene particles of 1760 and 3750 Angstrom units diameter by the method described in Example 7.

EXAMPLE 17

Nine grams of porous silica beads of 37–44 microns diameter (Porasil C-400, Waters Associates) was mixed with 20 ml of methanol, 4 ml of acrylic acid, and 0.2 g of ethylenediaminetetraacetic acid, sodium salt and the mixture was irradiated as described in Example 16 to a total dose of 1.2 megarads. After washing with aqueous sodium hydroxide, water and methanol as before, the surface-bonded silica beads were found to have a —COOH capacity of 0.16 meq/g.

Figure 15:
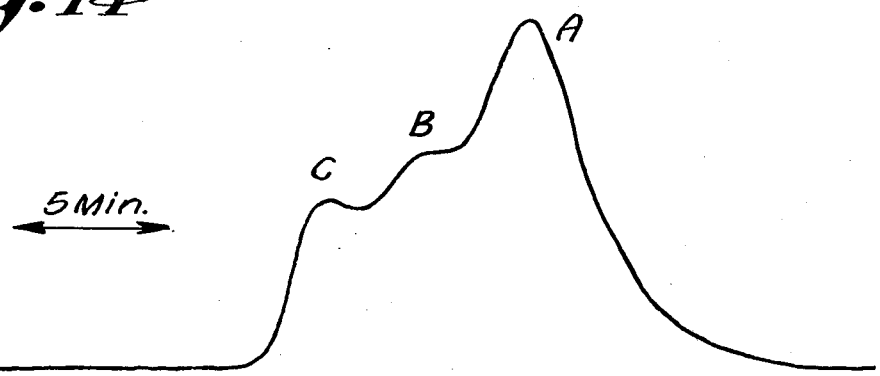
Figure 16:
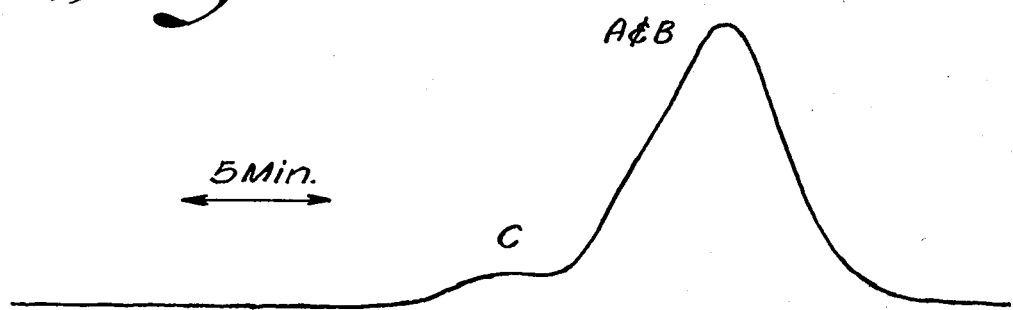

These surface-bonded silica beads were packed in a 0.6×50 cm column and the packed column was used for the successful chromatographic separation of dissolved sodium dichromate and 100,000 molecular weight sodium polystyrene sulfonate and suspended 2340 Angstrom units polystyrene latex particles by the method of Examples 7 and 16. FIG. 15 shows the separation obtained with the bonded silica bead packing where peaks A, B, and C represent sodium dichromate, the dissolved polymer, and the latex particles respectively. FIG. 16 shows the results obtained when the same dispersion and solution was passed through a similar column packed with the unmodified silica beads. In this comparative experiment, some separation of the latex particles from the dissolved components was obtained but there was no significant separation of the two dissolved components.

By the same general method as described in the above examples, S-DVB copolymer beads were coated with other polar solvent-swellable polymers using monomers such as vinyl acetate, 2-hydroxyethyl acrylate, acrylamide, and 2-aminoethyl methacrylate hydrochloride to obtain products having similar proportions of polar solvent-swellable polymer coating. The coated beads thereby obtained were also useful for the chromatographic separation of water-soluble polymer fractions of different molecular weights and the separation of suspended latex particles by particle size as illustrated in the above examples.

We claim:

1. A liquid chromatographic method for separating different particle size fractions of a suspended colloidal particle system and different molecular weight fractions of a dissolved polymer system, which method comprises passing a polar solvent dispersion containing at least one of said systems through a bed of essentially nonswellable inert granules of a water-insoluble inorganic solid having a chemically bonded surface coating of about 0.01–10 percent by weight of a hydrophilic polymer which is (a) a polymerized alpha-olefin having a functional group substituent selected from the group consisting of carboxyl, carboxy ester, amino, quaternary ammonium, amido, and sulfonate or (b) a water-soluble or methanol-soluble polyethylene glycol, polypropylene glycol or mixed ethylene-propylene polyglycol, said coating swellable by said polar solvent.

2. The method of claim 1 wherein the bonded polymer coating is a polymeric alpha-olefinic carboxylic acid.

3. The method of claim 2 wherein the granules are silica and the bonded polymer coating is polyacrylic acid.

4. The method of claim 1 wherein the polar solvent dispersion contains both a suspended colloidal particle system and a dissolved polymer system.

5. A liquid chromatographic method for separating different particle size fractions of a suspended colloidal particle system and different molecular weight fractions of a dissolved polymer system, which method comprises passing a polar solvent dispersion containing at least one of said systems through a bed of essentially nonswellable inert granules of a nonporous cross-linked organic polymer gel having a chemically bonded surface coating of about 0.01–10 percent by weight of a hydrophilic polymer which is a water-soluble or methanol-soluble polyethylene glycol, polypropylene glycol, or mixed ethylene-propylene polyglycol.

6. The method of claim 5 wherein the polymer coating is a polyethylene glycol.

7. The method of claim 5 wherein the polar solvent dispersion consists of a dissolved polymer system.

* * * * *